(12) United States Patent
Chimmalgi et al.

(10) Patent No.: US 9,341,761 B2
(45) Date of Patent: May 17, 2016

(54) SWITCHABLE LASER AND FIBER BASED LAMPHOUSE FOR OPTIMAL POWER OUTPUT IN DIFFERENT WAVELENGTH BANDS AND PIXEL SIZES

(71) Applicant: KLA-Tencor Corporation, Milpitas, CA (US)

(72) Inventors: Anant Chimmalgi, San Jose, CA (US); Rahul Yadav, Sunnyvale, CA (US); Joshua Wittenberg, Fremont, CA (US)

(73) Assignee: KLA-Tencor Corporation, Milpitas, CA (US)

( * ) Notice: Subject to any disclaimer, the term of this patent is extended or adjusted under 35 U.S.C. 154(b) by 43 days.

(21) Appl. No.: 14/301,781

(22) Filed: Jun. 11, 2014

(65) Prior Publication Data

US 2015/0268400 A1    Sep. 24, 2015

Related U.S. Application Data

(60) Provisional application No. 61/954,996, filed on Mar. 18, 2014.

(51) Int. Cl.
*F21V 8/00* (2006.01)
*G02B 6/35* (2006.01)

(52) U.S. Cl.
CPC ............ *G02B 6/0006* (2013.01); *G02B 6/3512* (2013.01)

(58) Field of Classification Search
CPC ............ F21V 2200/00; F21V 2200/10; G02B 6/0006; G02B 6/3512; G02B 6/4298; G02B 26/08; G02B 6/00; G02B 6/0005; G02B 6/35; G02B 6/354; G02B 6/3542
See application file for complete search history.

(56) References Cited

U.S. PATENT DOCUMENTS

| | | | |
|---|---|---|---|
| 7,244,937 B1 * | 7/2007 | Gabura | G01B 11/0616 250/341.2 |
| 2006/0172207 A1 | 8/2006 | Asaba et al. | |
| 2008/0247632 A1 | 10/2008 | Boehm et al. | |
| 2008/0297752 A1 | 12/2008 | Wang et al. | |
| 2009/0012407 A1 | 1/2009 | Zuluaga et al. | |
| 2010/0034225 A1 * | 2/2010 | Yagyu | G02B 6/0006 372/34 |
| 2010/0191060 A1 * | 7/2010 | Shimotsu | A61B 1/07 600/178 |
| 2011/0249244 A1 | 10/2011 | Leewis et al. | |

(Continued)

FOREIGN PATENT DOCUMENTS

| | | |
|---|---|---|
| JP | 2000-126884 A | 5/2000 |
| JP | 2005-215120 A | 8/2005 |
| JP | 2011-186267 A | 9/2011 |
| JP | 2012-253378 A | 12/2012 |

*Primary Examiner* — Bao Q Truong
(74) *Attorney, Agent, or Firm* — Suiter Swantz pc llo

(57) ABSTRACT

Systems and methods for providing laser sustained plasma light sources are disclosed. Different from conventional laser sustained plasma light sources where one fiber size and one wavelength combination is used in the lamphouse to generate light for different bands and pixel sizes, switchable fiber sizes and wavelength combinations are provided for optimal power output in different wavelength bands and pixel sizes. More specifically, switchable fiber configurations are provided where larger fibers with higher pump powers are used for bigger pixel sizes and higher wavelength bands while smaller fibers are used for smaller pixel size and shorter wavelength bands. Additionally and/or alternatively, pumping schemes are provided where pump wavelengths close to the absorption peak of the gas fill are used for bigger pixel sizes while pump wavelengths away from the gas fill absorption peak are used for smaller pixel sizes.

18 Claims, 4 Drawing Sheets

(56) References Cited

U.S. PATENT DOCUMENTS

2012/0303151 A1  11/2012  Ye et al.
2013/0329224 A1* 12/2013  Takaoka ............ A61B 1/00096
                                              356/402
2014/0240951 A1*  8/2014  Brady ................... F21V 13/08
                                              362/19

* cited by examiner

SWITCHABLE LASER AND FIBER BASED LAMPHOUSE FOR OPTIMAL POWER OUTPUT IN DIFFERENT WAVELENGTH BANDS AND PIXEL SIZES

CROSS-REFERENCE TO RELATED APPLICATIONS

The present application claims the benefit under 35 U.S.C. §119(e) of U.S. Provisional Application Ser. No. 61/954,996, filed Mar. 18, 2014. Said U.S. Provisional Application Ser. No. 61/954,996 is hereby incorporated by reference in its entirety.

TECHNICAL FIELD

The disclosure generally relates to the field of inspection tools, particularly to inspection tools utilizing laser sustained plasma light sources.

BACKGROUND

Laser sustained plasma light sources can be utilized for various applications. For instance, certain inspection tools may use laser sustained plasma light sources for product inspection. In such tools, light from a multi-kilowatt diode laser is used to sustain plasma usually in a conventional xenon or mercury-xenon arc lamp. Various other types of media may also be utilized to sustain the plasma.

SUMMARY

The present disclosure is directed to a method for controlling a fiber based illumination system. The method includes: determining an optimal fiber size suitable for a given illumination requirement; selecting at least one fiber input among a plurality of available fiber inputs based on the determined optimal fiber size; and utilizing the selected at least one fiber input to deliver light from a light source to a lamphouse of the illumination system.

A further embodiment of the present disclosure is directed to an illumination system. The illumination system includes at least one light source, a lamphouse, a plurality of available fiber inputs, and a controller. The controller is configured to: determine an optimal fiber size suitable for a given illumination requirement; select at least one fiber input among the plurality of available fiber inputs based on the determined optimal fiber size; and utilize the selected at least one fiber input to deliver light from the at least one light source to the lamphouse.

An additional embodiment of the present disclosure is also directed to an illumination system. The illumination system includes at least one light source, a lamphouse and a plurality of available fiber inputs housed in a fiber switching mechanism. The fiber switching mechanism is configured to switch between the plurality of available fiber inputs utilizing mirrors corresponding to the plurality of available fiber inputs. The illumination system also includes a controller configured to: determine an optimal fiber size suitable for a given illumination requirement; select at least one fiber input among the plurality of available fiber inputs based on the determined optimal fiber size; and utilize the selected at least one fiber input to deliver light from the at least one light source to the lamphouse.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

Figure 1:
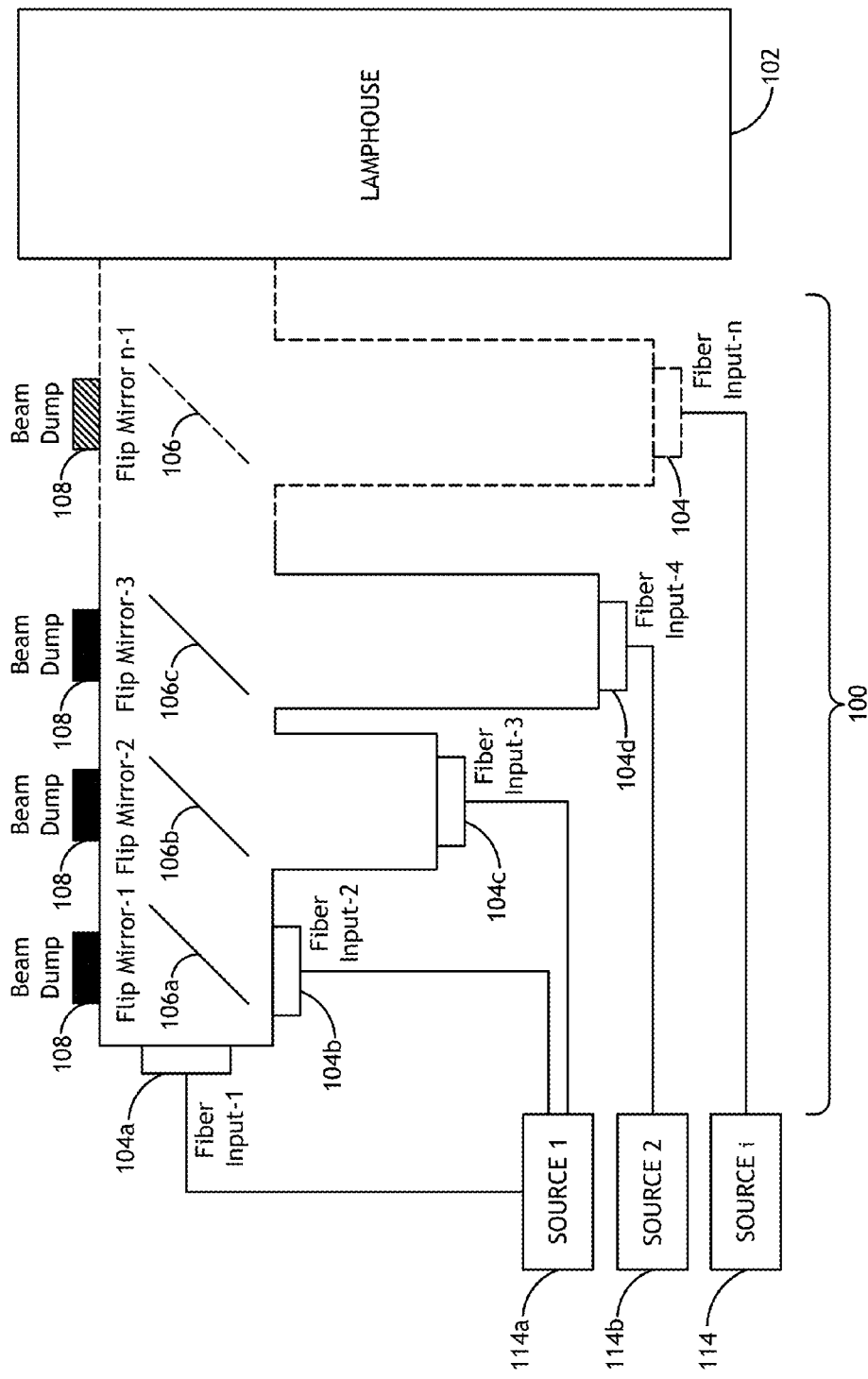
FIG. 1 is an illustration depicting a fiber switching mechanism.

Reference will now be made in detail to the subject matter disclosed, which is illustrated in the accompanying drawings.

Tools utilizing laser sustained plasma light sources generally benefit from increased output power from such light sources. To satisfy the increasing need for collectible power, the laser pump power must be increased. As the laser pump power is increased, the plasma begins to grow in size and saturate in brightness at the center. Since the light source collects light only from the center of the plasma, increasing the pump power above a certain level does not lead to a corresponding increase in the usable power.

In order to effectively increase the collectible output power, multiple laser parameters can be varied to mitigate the plasma brightness saturation and optimize the collectible power. For instance, the laser pump wavelength is a critical parameter for achieving higher collectible power since the plasma size is a function of the laser pump wavelength. At strongly absorbed wavelengths for the chosen gas medium, the plasma can be sustained at lower laser intensities. The plasma can therefore extend farther from the absolute focus of the laser, resulting in a growth in size of the plasma. Therefore, the pump wavelengths should be chosen far from any absorption peak of the gas medium.

The plasma brightness is also a function of the chosen delivery fiber size. A smaller fiber size will have a tighter focus at the plasma location which results in compact and bright plasma. However, the maximum laser power that can be coupled into a fiber at a given wavelength is limited by its size. To increase the pump power, multiple wavelengths may be coupled, but this coupling makes it difficult to optimize the pump wavelengths for smaller fiber sizes. For larger fiber sizes, fewer wavelengths can be used to achieve the same pump power, but the focus for these fibers is not as tight. One technique to overcome this limitation is to use fiber lasers (in which the gain medium is an optical fiber instead of a diode), which inherently have a better beam quality. These lasers can couple light similar or higher in power than the diode lasers in a much smaller fiber (few tens to few hundreds of microns) with just one wavelength. However, such lasers are more expensive than diode lasers. The following table summarizes the merits and demerits of some of the different fiber sizes, for illustrative purposes:

| Fiber Sizes | Merits | Demerits |
| --- | --- | --- |
| 600 micron | Relatively Cheap | Limited by the power that can be coupled into the fiber |
| 2000 micron | Better collection efficiency due to compact and bright plasma Relatively Cheap | Lower collection efficiency due to large and dim plasma |
| 200 micron | Higher powers can be coupled into the fiber Best collection efficiency due to compact and bright plasma | Relatively Expensive |

Based on the laser roadmap, to increase the output power, either a bigger fiber size is required or more wavelengths are to be coupled into the fiber. On increasing the fiber size, with higher pump power, although there will be an increase in collectible output power for bigger pixel sizes, the plasma will grow in size and become dimmer. This will lead to a reduction in collectible output power for smaller pixels. Even for the bigger pixels, the larger fiber could cause a reduction in collectible power for shorter wavelengths because these wavelengths are mostly generated at the center of the plasma and using a larger fiber leads to a reduction in brightness of the plasma in the center.

The present disclosure is directed to systems and methods for providing laser sustained plasma light sources without the aforementioned shortcomings. Different from conventional laser sustained plasma light sources where one fiber size and one wavelength combination is used in the lamphouse to generate light for different bands and pixel sizes, switchable fiber sizes and wavelength combinations are provided for optimal power output in different wavelength bands and pixel sizes. More specifically, in some embodiments in accordance with the present disclosure, switchable fiber configurations are provided where larger fibers with higher pump powers are used for bigger pixel sizes and higher wavelength bands while smaller fibers are used for smaller pixel size and shorter wavelength bands. Additionally and/or alternatively, pumping schemes are provided where pump wavelengths close to the absorption peak of the gas fill are used for bigger pixel sizes while pump wavelengths away from the gas fill absorption peak are used for smaller pixel sizes.

Referring now to FIG. 1, a schematic of a generalized implementation of a fiber switching mechanism 100 on the lamphouse 102 in accordance with one embodiment of the present disclosure is shown. As depicted in this figure, a number n of fibers 104 are connected to the fiber switching mechanism 100 to provide illumination for the lamphouse 102. These n fibers 104 may be different in size and may be selectively/conditionally engaged or disengaged. A plurality of flip mirrors 106 are also positioned in the fiber switching mechanism 100. By bringing in a suitable flip mirror 106, the light from a particular fiber 104 can be optically coupled into the lamphouse 102. For instance, all mirrors 106 may be removed from the optical path between the fiber input 1 (104A) and the lamphouse 102 to optically couple the fiber input 1 (104A) to the lamphouse 102. In another example, mirrors 3 through n–1 may be removed from the optical path between mirror 2 (106B) and the lamphouse 102 to optically couple the fiber input 3 (104C) to the lamphouse 102. It is understood that coupling between other fiber inputs and the lamphouse 102 can be achieved in the similar manner as described above.

It is contemplated that the mirrors 106 provided in the fiber switching mechanism 100 are depicted as flip mirrors merely for illustrative purposes. These mirrors are not required to be flipped in and out of the optical path, and other types of physical movements (e.g., sliding or the like) may be implemented to position the mirrors accordingly.

It is also contemplated that the mirrors 106 may not need to be physically moved to accomplish fiber switching. For instance, wavelength coupling techniques may be implemented, wherein a mirror (e.g., mirror 3, 106C) corresponding to a particular fiber input (e.g., input 4, 104D) is configured to only reflect wavelength of that particular fiber input 104D towards the lamphouse 102, and that mirror 106C may not have any optical effects on any other fiber inputs (e.g., input 1, 104A) even if that mirror 106C is physically positioned on the optical path between fiber input 104A and the lamphouse 102. Similarly, polarization coupling techniques may be implemented, wherein a mirror corresponding to a particular fiber input is configured to only reflect input having a matching polarization. It is contemplated that other coupling techniques, such as spatial coupling or the like, may also be utilized to accomplish fiber switching.

In accordance with the present disclosure, the different fiber inputs 104 may be coming out from a single laser or different lasers. In one exemplary implementation, four different fiber sizes (0.2 mm, 0.6 mm, 1 mm and 2 mm) are utilized, where the three bigger fiber sizes are delivering light from a shared laser source 1 (114A) while the smallest fiber delivers light from a fiber laser source 2 (114B). In another example, to reduce the cost, the 0.2 mm fiber is not required and all fiber inputs are coming from a shared laser source (e.g., a diode laser). The shared laser source may be equipped with beam switches to serve as the illumination source for different fibers. Generally, larger fiber sizes can be used when the tool is configured for larger pixel size or longer wavelengths. The fiber can be switched to a smaller size when the tool is configured for smaller pixel size or shorter wavelengths/broadband light. It is understood that such implementations are merely exemplary; various fiber sizes from various laser sources 114 may be utilized without departing from the spirit and scope of the present disclosure.

It is also understood that it is important to sustain plasma during the switching process. To accomplish this, in certain embodiments, the pump laser light is sent in the fiber which is to be used next before the currently used fiber stops. For example, if fiber input 1 (104A) is being used currently and the fiber switching mechanism 100 needs to switch the input to fiber input 3 (104D), the fiber input 3 should be engaged prior to disengaging fiber input 1. If fiber inputs 1 and 3 share the same pump laser source, the total power can be equally divided between the two fibers. Once the light starts to come out of both fibers, their corresponding mirror(s) can be positioned in place as described above. If flip mirrors are utilized, they can be configured to be reflective on both sides such that during the switching process, the excess pump laser light can be directed towards the beam dumps 108. Subsequently, after the switching process is completed, the light in the initially used fiber (fiber input 1 in the example above) can be stopped and the entire laser pump light for the lamphouse can be delivered through the new fiber (fiber input 3 in the example above).

Figure 2:
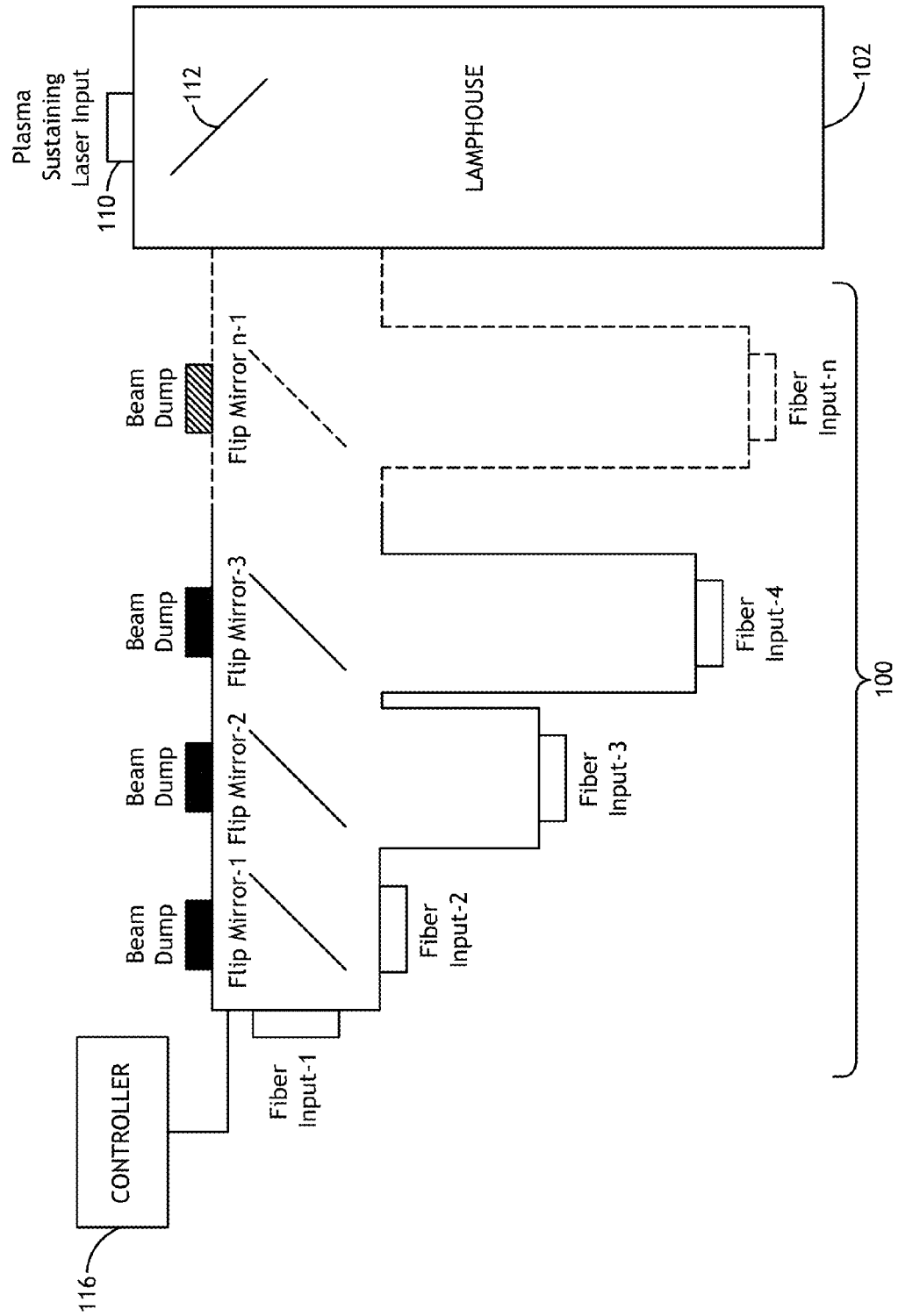
FIG. 2 is an illustration depicting a fiber switching mechanism with an auxiliary input.

Alternatively, an auxiliary laser input independent from the rest of the switching mechanism may be utilized to sustain the plasma during the switching process. Referring to FIG. 2, the auxiliary laser input 110, also referred to as the plasma sustaining laser input, is depicted. This auxiliary laser input 110 provides a fiber from a plasma sustaining laser. In one embodiment, the plasma sustaining laser is only turned on at the time of the fiber switching. This laser may be operating at a different wavelength from the rest of the lasers so that the light can be sent into the lamphouse 102 using a dichroic filter 112 without affecting operations of the rest of the fiber inputs. It is understood that the auxiliary laser input 110 shown in FIG. 2 is merely exemplary. One or more auxiliary laser input sources positioned at one or more different locations may be utilized to sustain the plasma without departing from the spirit and scope of the present disclosure.

Figure 3:
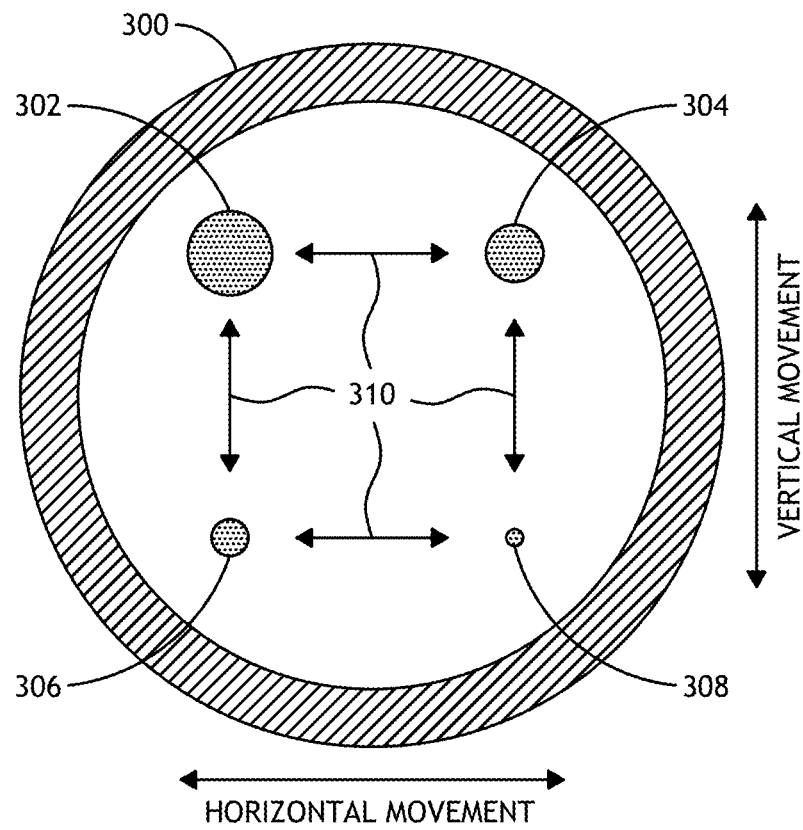
FIG. 3 is a cross-sectional diagram of a fiber bundle.

Furthermore, it is noted that each fiber input 104 is not required to be limited to a fixed fiber size. That is, a fiber input 104 may be configured in an adjustable manner that allows the particular fiber input 104 to switch between different sizes. In one embodiment, multiple fibers are bundled together to deliver light out through the same fiber input. FIG. 3 is a cross-sectional view illustrating an exemplary fiber bundle 300.

As depicted in FIG. 3, multiple fibers 302 through 308 are oriented in the same direction and are positioned as close as possible, separated from each other only by their cooling limitations 310 (e.g., ~5 mm). While four fibers 302 through 308 are depicted in this example, it is understood that the specific number of fibers to be bundled, and their specific sizes, may vary depending on specific application without departing from the spirit and scope of the present disclosure.

The relative position between the cross-section of the bundle 300 and its corresponding laser/illumination source is adjustable. This allows different fibers within the bundle 300 to be utilized as the delivering fiber. To make a switch between the fibers within such a bundle 300, the power is gradually distributed from the outgoing delivering fiber to the incoming delivering fiber. Once the incoming delivering fiber is moved in place, full power is coming out from the incoming delivering fiber.

It is noted that during this switching process, both the outgoing delivering fiber and the incoming delivering fiber may deliver the laser power, even through the laser power may be delivered at suboptimal levels. As a result, the plasma position and shape may also be suboptimal. However, since this switching process is very short, the adverse effect is negligible. More importantly, because both the outgoing delivering fiber and the incoming delivering fiber are delivering the laser power during this switching process, the plasma can still be sustained and maintained at approximately the same temperature. Therefore, lamp is not required to be restarted and cooling does not need to be adjusted.

It is contemplated that fiber bundles 300 as described above may be utilized by one or more fiber inputs 104. In this manner, fiber switching within a bundle 300 and fiber switching among different fiber inputs 104 may be used in conjunction. Alternatively, a fiber bundle 300 may be utilized independently to provide illumination for a lamphouse, without the fiber switching mechanism 100, and still provide the abilities to switch between different fibers.

To reiterate, providing the abilities to switch between different fibers is beneficial because it allows for optimizing the lamphouse power output while the tool is operating under different optics states. For example, when a user or an inspection tool chooses a particular optics state, the controller 116 of the illumination system can automatically select the optimal fiber size for this use case so that light from the selected fiber is getting directed towards the lamphouse. Generally, a larger fiber allows pumping higher laser powers, which is suitable for generating higher raw power for larger pixel sizes and larger wavelengths. On the other hand, a smaller fiber results in a more compact and brighter plasma, which results in improved performance for smaller pixels and wavelengths.

Figure 4:
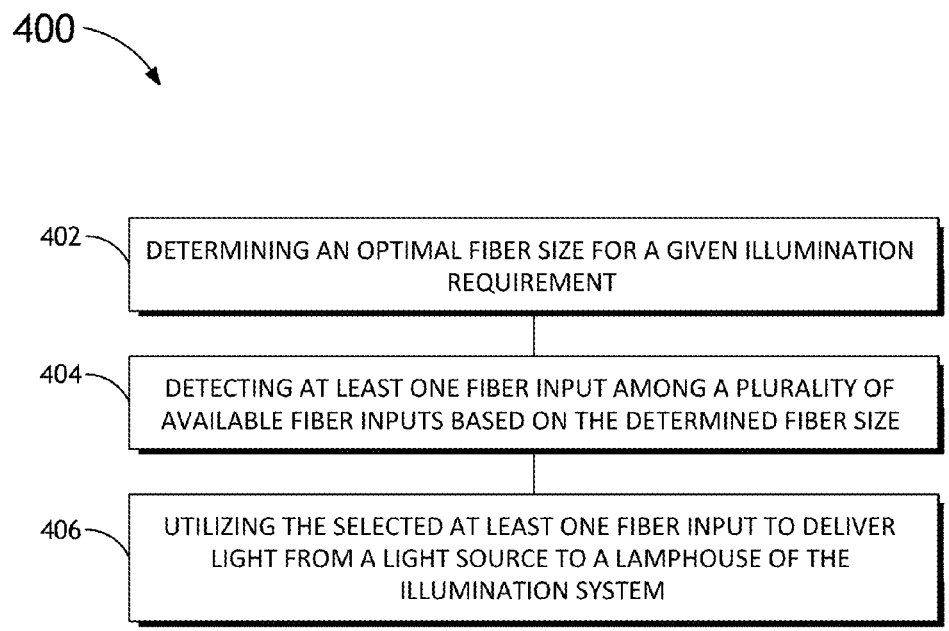
FIG. 4 is flow diagram illustrating a method for providing and controlling a switchable laser and fiber based lamphouse for optimal power output.

Referring now to FIG. 4, a flow diagram depicting a method 400 for providing and controlling a switchable laser and fiber based lamphouse for optimal power output is shown. The switchable laser and fiber based lamphouse may be controlled by a controller (e.g., a computer processor or the like). As depicted in FIG. 4, upon receiving a current optics state and/or requirement, the controller may determine an optimal fiber size for this particular optics state and/or requirement in step 402. The controller may then select, among a plurality of different available fibers, one or more fibers to deliver light to the lamphouse based on the determined optimal fiber size in step 404. Subsequently, the one or more fibers selected by the controller may be switched into their corresponding engaged positions in step 406 and serve to deliver light to the lamphouse.

It is contemplated that the one or more selected fibers may be switched into their corresponding engaged positions utilizing the various switching techniques previously described. In addition, one or more auxiliary plasma sustaining laser inputs may be equipped when certain switching techniques are utilized. It is also contemplated that the switchable laser and fiber based illumination system and method as described above are not limited to providing illumination for inspection tools. Illumination systems in accordance with embodiments of the present disclosure may be utilized in various different applications without departing from the spirit and scope of the present disclosure.

It is to be understood that the present disclosure may be implemented in forms of a hardware/software/firmware package. Such a package may be a computer program product which employs a computer-readable storage medium/device including stored computer code which is used to program a computer to perform the disclosed function and process of the present disclosure. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

The methods disclosed may be implemented as sets of instructions, through a single production device, and/or through multiple production devices. Further, it is understood that the specific order or hierarchy of steps in the methods disclosed are examples of exemplary approaches. Based upon design preferences, it is understood that the specific order or hierarchy of steps in the method can be rearranged while remaining within the scope and spirit of the disclosure. The accompanying method claims present elements of the various steps in a sample order, and are not necessarily meant to be limited to the specific order or hierarchy presented.

It is believed that the system and method of the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory.

What is claimed is:

1. A method for controlling a fiber based illumination system, the method comprising:

determining a first fiber size suitable for a first illumination requirement;

determining a second fiber size suitable for a second illumination requirement;

selecting at least one first fiber input among a plurality of available fiber inputs based on the determined first fiber size;

delivering light from a light source to a lamphouse of the illumination system utilizing the selected at least one first fiber input;

selecting at least one second fiber input among the plurality of available fiber inputs based on the determined second fiber size; and switching from the at least one first fiber input to the at least one second fiber input to deliver light from the light source to the lamphouse of the illumination system.

2. The method of claim 1, wherein said switching from the at least one first fiber input to the at least one second fiber input is accomplished utilizing mirrors corresponding to the at least one first fiber input and the at least one second fiber input.

3. The method of claim 1, wherein the at least one first fiber input and the at least one second fiber input are bundled within a fiber bundle, and wherein said switching from the at least one first fiber input to the at least one second fiber input is accomplished by fiber switching within the fiber bundle.

4. The method of claim 1, further comprising:
delivering light to the lamphouse of the illumination system utilizing an auxiliary input during said switching.

5. The method of claim 1, wherein at least two of the plurality of available fiber inputs are different in size.

6. The method of claim 1, wherein said determining the first fiber size and said determining the second fiber size are based on at least one of: a pixel size requirement and a wavelength requirement.

7. The method of claim 1, wherein said fiber based illumination system is a laser sustained plasma illumination system.

8. An illumination system, comprising:
at least one light source;
a lamphouse;
a plurality of available fiber inputs; and
a controller configured to:
    determine a first fiber size suitable for a first illumination requirement;
    determine a second fiber size suitable for a second illumination requirement;
    select at least one first fiber input among the plurality of available fiber inputs based on the determined first fiber size;
    utilize the selected at least one first fiber input to deliver light from the at least one light source to the lamphouse;
    select at least one second fiber input among the plurality of available fiber inputs based on the determined second fiber size; and
    switch from the at least one first fiber input to the at least one second fiber input to deliver light from the light source to the lamphouse of the illumination system.

9. The illumination system of claim 8, wherein the plurality of available fiber inputs is housed in a fiber switching mechanism, and wherein said fiber switching mechanism is configured to switch from the at least one first fiber input to the at least one second fiber input utilizing mirrors corresponding to the at least one first fiber input and the at least one second fiber input.

10. The illumination system of claim 8, wherein the plurality of available fiber inputs is bundled within a fiber bundle, and wherein the controller is configured to switch from the at least one first fiber input to the at least one second fiber input by fiber switching within the fiber bundle.

11. The illumination system of claim 8, further comprising:
an auxiliary input, the auxiliary input configured to deliver light to the lamphouse when the at least one first fiber input is being switched to the at least one second fiber input.

12. The illumination system of claim 8, wherein at least two of the plurality of available fiber inputs are different in size.

13. The illumination system of claim 8, wherein the controller is configured to determine the first fiber size and the second fiber size based on at least one of: a pixel size requirement and a wavelength requirement.

14. The illumination system of claim 8, wherein said illumination system is a laser sustained plasma illumination system.

15. An illumination system, comprising:
at least one light source;
a lamphouse;
a plurality of available fiber inputs housed in a fiber switching mechanism, wherein the fiber switching mechanism is configured to switch between the plurality of available fiber inputs utilizing mirrors corresponding to the plurality of available fiber inputs; and
a controller configured to:
    determine a first fiber size suitable for a first illumination requirement;
    determine a second fiber size suitable for a second illumination requirement;
    select at least one first fiber input among the plurality of available fiber inputs based on the determined first fiber size;
    utilize the selected at least one first fiber input to deliver light from the at least one light source to the lamphouse;
    select at least one second fiber input among the plurality of available fiber inputs based on the determined second fiber size; and
    switch from the at least one first fiber input to the at least one second fiber input to deliver light from the light source to the lamphouse of the illumination system.

16. The illumination system of claim 15, further comprising:
an auxiliary input, the auxiliary input configured to deliver light to the lamphouse when the fiber switching mechanism is switching between the plurality of available fiber inputs.

17. The illumination system of claim 15, wherein the controller is configured to determine the first fiber size and the second fiber size based on at least one of: a pixel size requirement and a wavelength requirement.

18. The illumination system of claim 15, wherein said illumination system is a laser sustained plasma illumination system.

* * * * *